May 15, 1951  I. JEPSON  2,552,972
MEANS FOR ROTATING MIXER BOWLS
Filed May 19, 1948  2 Sheets-Sheet 1
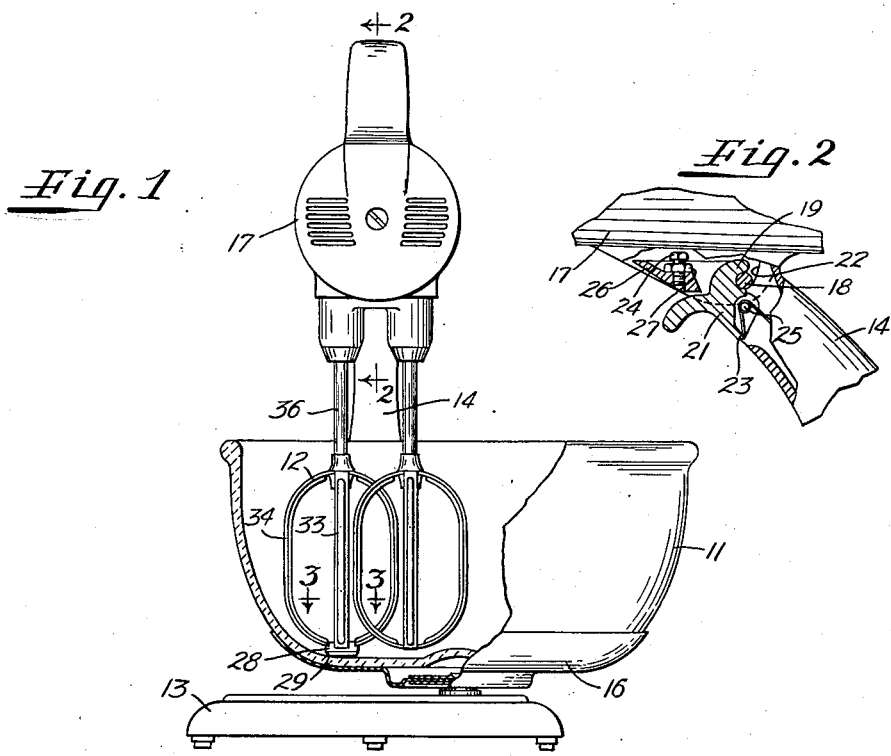
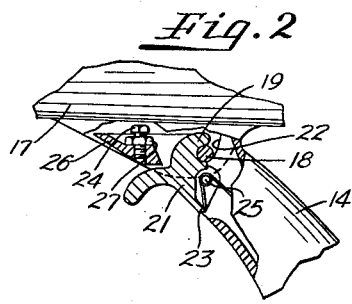
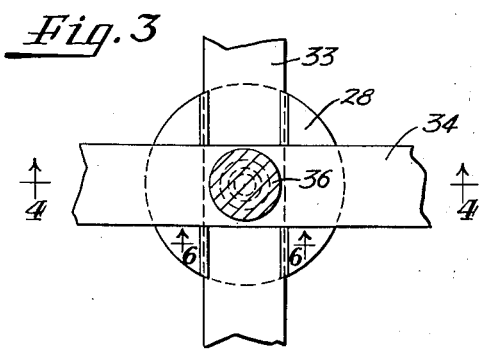
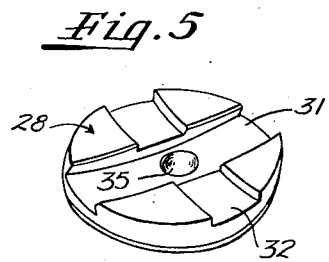
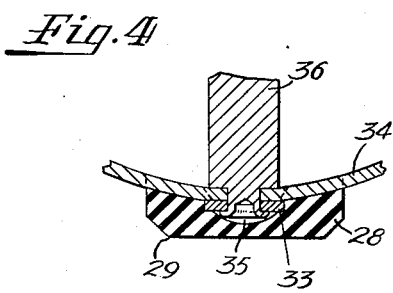
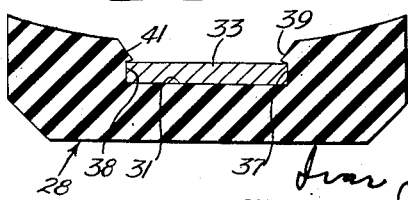
INVENTOR.
Ivar Jepson
BY McCanna & Morsbach
ATTYS.

May 15, 1951 — I. JEPSON — 2,552,972
MEANS FOR ROTATING MIXER BOWLS
Filed May 19, 1948 — 2 Sheets-Sheet 2
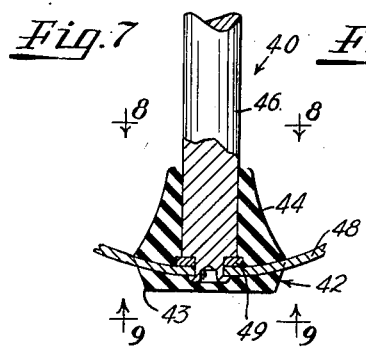
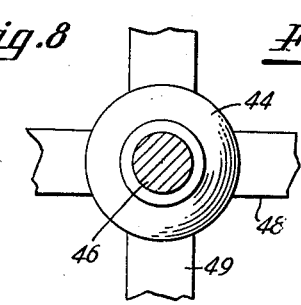
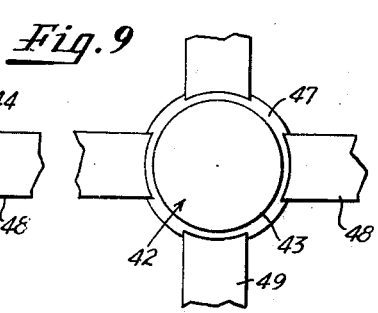
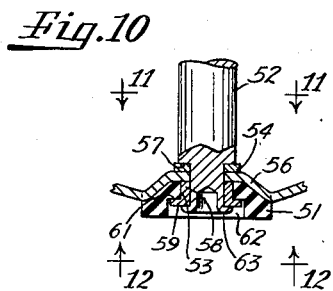
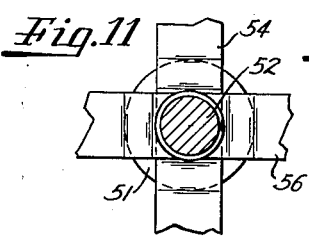
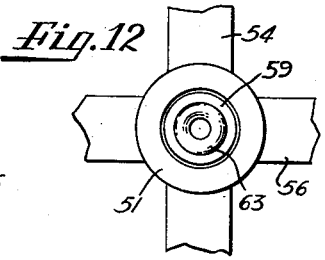
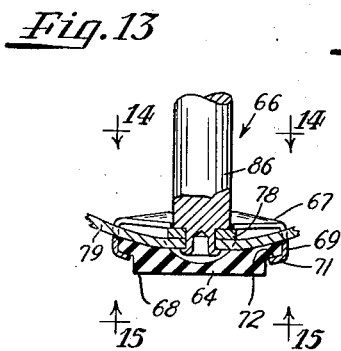
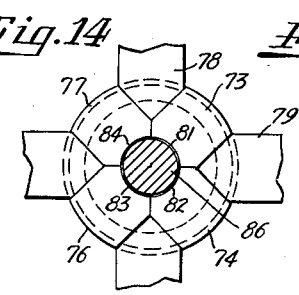
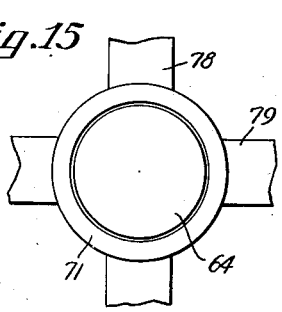
INVENTOR.
Ivar Jepson
BY McCanna & Morsbach
ATTYS.

Patented May 15, 1951

2,552,972

UNITED STATES PATENT OFFICE 2,552,972

MEANS FOR ROTATING MIXER BOWLS

Ivar Jepson, Oak Park, Ill., assignor to Sunbeam Corporation, Chicago, Ill., a corporation of Illinois Application May 19, 1948, Serial No. 28,019

9 Claims. (Cl. 259—84)

This invention relates to food mixers and more particularly to an improved drive means for positively effecting the rotation of a mixing bowl.

It has long been a problem, in power driven food mixers, of providing simple, inexpensive, and satisfactory means for rotating the mixing bowl while the mixer is in operation to assure a thorough intermixing of the ingredients in the mixing bowl. Heretofore the bowl has been rotated by the operator or the beaters have been arranged to turn the bowl through the medium of the ingredients being mixed. However, in the latter case when the ingredients vary in consistency there will be variation in the manner in which the mixing bowl is rotated. This is not entirely satisfactory since the operator finds many instances in which he would like to be assured of predetermined rotation even when the consistency of the mixture is that of a liquid. To overcome these objections, in one instance a driving head has been attached to a beater shaft to engage the bowl and drive the latter while the beaters are rotating. While this is an improvement over the previous constructions in which no direct driving means were employed, it has several disadvantages. This head has been formed of metal. As a result it is found that a dark streak appears in the bottom of the bowl where the metal engages the bowl. This is believed to be due to the small metal particles being abraded by the surface of the glass mixing bowl. Metal driving heads also have the disadvantage that they are relatively noisy in operation. Also, the metal tends to corrode when subjected to certain foods.

An object of this invention is, therefore, to provide a drive means between a beater and the mixing bowl which has relatively long life, which is simple in construction and relatively inexpensive to manufacture, and which will satisfactorily perform the desired bowl rotating function.

Another object of the invention is to provide a drive means of the above character which is not noisy in operation, which does not leave dark streaks on the bottom of the bowl at the point of engagement with the bowl, and which is not effected appreciably by foods with which it comes in contact.

Another object of the invention is to provide a drive means of the above character which is formed from material having sufficient resiliency to distribute the pressure between the beater and the bowl over a relatively large contact area.

Another object of the invention is to provide a novel means for securing the drive means to the beater.

Other objects and advantages of the invention will become apparent from the following detailed description taken in connection with the accompanying drawings, in which—

Figure 1 is an end view of a food mixer and a cutaway view of a mixing bowl embodying the present invention;

Fig. 2 is a fragmentary sectional view taken substantially along the line 2—2 of Figure 1;

Fig. 3 is an enlarged sectional view taken substantially along the line 3—3 of Figure 1;

Fig. 4 is a sectional view taken substantially along the line 4—4 of Fig. 3;

Fig. 5 is a perspective view of a drive disc;

Fig. 6 is a further enlarged sectional view taken along the line 6—6 of Fig. 3;

Fig. 7 is a sectional view of a modified form of the invention;

Figs. 8 and 9 are sectional and bottom views, respectively, taken along the lines 8—8 and 9—9 of Fig. 7;

Fig. 10 is a sectional view of still another embodiment of the invention;

Figs. 11 and 12 are sectional and bottom views, respectively, taken substantially along the lines 11—11 and 12—12 of Fig. 10;

Fig. 13 is a sectional view of still another embodiment of the invention; and

Figs. 14 and 15 are sectional and bottom views, respectively, taken along the lines 14—14 and 15—15 of Fig. 13.

Referring now to the drawings, the invention is shown embodied in a novel drive means for a food mixer in which a mixing bowl 11 is positively rotated by one of the beaters 12. As shown in Figure 1 for purposes of illustration, the food mixer includes a base 13 having an upstanding support 14 mounted at one end of the base and a turntable 16 shaped to support the mixing bowl 11 at the opposite end of the base. A motor 17 for driving the beaters 12 and overlying the turntable is pivotally or otherwise suitably mounted on the support. To effect the pivotal mounting in this instance the underside of the casing of the motor 17 is formed with a lug 18 spaced from the casing and shaped to be received between a hook shaped end 19 of a lever 21 and a shoulder 22 formed on the support 14, as shown in Figure 2. The lever is pivotally mounted on the support as by a pin 25 and is biased by a spring 23 to urge the hook shaped end into engagement with the lug 18. An adjustable stop 24 on the support 14 is provided for determining the at rest position or the position of the motor 17. The stop is formed by a screw threaded into a rib 26 integral with the support and positioned so that the casing of the motor 17 engages the head of the screw. A lock nut 27 secures the screw in any desired adjusted position.

According to my invention the means for positively driving the bowl, as shown in Figure 1, is in the form of a friction drive disc 28 of a particular character shaped to be disposed between one of the beaters 12 and the bowl 11. As shown the disc 28 is formed with an annular portion or edge 29 shaped to engage the bowl 11. Preferably the disc is of such shape and dimensions that with the mixing bowl in the position shown in Figure 1 the edge 29 engages the inclined side or bottom wall of the bowl. My invention contemplates the provision of a disc formed of plastic material having the qualities, namely, (a) good resistance to wear under the rubbing action involved, (b) relatively high coefficient of friction in contact with the bowl material, (c) no discoloring or marking of the bowl, (d) chemically inert with respect to all foods being mixed, (e) silent in operation, (f) inexpensive and easy to manufacture, and (g) easy to clean. I have formed this disc of a polyamide plastic material, preferably a polyamide synthetic resinous material known as "nylon." I have discovered that with such material the disc 28 performs especially well both with the bowl 11 dry and when there are ingredients in it. This material is relatively unaffected by foods with which it comes in contact. The polyamide material has especially good wearing qualities and does not abrade readily due to the action of the glass on the driving disc 28. As a consequence the driving disc does not leave a dark ring or the like around the edges of the bowl 11 where the driving disc engages the latter. It is believed that the relatively long life of the driving disc 28 when formed from polyamide material is due to the fact that this material has certain inherent resiliency. This permits the disc to change its configuration sufficiently to conform at least partially to the curvature of the small cavities in the bowl surface and thus distributes the pressure between the disc 28 and the bowl over a relatively large contact area. With this construction the noise resulting from the frictional engagement between the bowl 11 and the disc 28 is of negligible degree.

Suitable means is provided for positively retaining the disc 28 in position on the beater 12. For this purpose as shown in Figs. 2–5, the disc is formed on one side with transversely extending grooves 31 and 32. The latter are of the same width as the bands 33 and 34 which cross over each other and are secured to an elongated shaft 36, as by peening over the end of the shaft, to form the beaters 12, and are disposed on the disc 28 at angles corresponding to the angles between the bands 33 and 34. As shown in Figs. 4 and 5 the bottoms of the grooves 31 and 32 are of arcuate shape to fit the curvature of the respective bands 33 and 34. As best seen in Fig. 6 the groove 31 is formed with undercut side walls 37 and 38 to form inwardly projecting portions 39 and 41, respectively, shaped to overlie the band 33 and positively secure the disc 28 to the beater 12. The resiliency of the polyamide material permits the disc 28 to be readily shaped into position on the end of the beater. It is to be understood that where desired both grooves 31 and 32 may be formed with inwardly projecting portions 39 and 41 shaped to engage the respective bands 33 and 34. Also it is to be understood that the portions 39 and 41 of the side walls overlying the band 33 may be staked to insure against the accidental removal of the driving disc 28 from the beater 12. A recess 35 formed in the bottom of the groove 31 is provided for receiving the peened over end of the shaft 36 when the disc is in position. Discs 28 of the above construction may be readily molded or formed by other processes. The above disc construction is also advantageous in that the disc may be readily removed and cleaned. Moreover, the disc is shaped and positioned so that it does not interfere with the cleaning of the beater 12 on which it is mounted.

In the present instance, during operation of the mixer the drive disc 28 is held in positive frictional driving engagement with the bowl 11 by the motor 17. For this purpose the stop 24 is adjusted so that with the beaters 12 in the position shown in Figure 1 the motor is raised above the stop as shown in Fig. 2. With the respective parts of the mixer in this position the weight of the motor 17 positively urges the drive disc 28 into frictional engagement with the mixing bowl 11. Rotation of the disc causes the annular edge 29 to engage the side or bottom wall of the bowl and in turn rotate the bowl. It is to be understood that the speed of rotation of the bowl necessarily depends on the speed of the beaters. Thus if the beaters are operating at a high speed the bowl rotates faster than when the beaters are operating at a lower speed.

In the embodiment of the invention shown in Figs. 7–9 the drive member 42 of material similar to the disc 28 is shown as being molded directly on the lower end of a beater 40. The portion of the drive member extending outwardly from the beater is formed with an annular edge 43 shaped to engage the bowl 11, as in the manner described for the embodiment shown in Figs. 1–6. The sleeve portion 44 of the molded driving member embraces a shaft 46 and is connected at annularly spaced points 47 between cross bands 48 and 49, with the driving disc 42.

In the embodiment shown in Figs. 10–12 the drive disc 51 of material similar to the disc 28 is riveted to a shaft 52. For this purpose the disc 51 is formed with a central opening 53 shaped to fit over the lower end of the shaft 52. To assemble the disc 51 and cross pieces 54 and 56 on the shaft 52, the band 54 is positioned to abut against a shoulder 57 formed at the lower end of the shaft 52 and the band 56 is disposed in side by side relation with the band 54 and crosses over the band 54, as shown. A collar 58 is disposed on the extreme end of the shaft and is provided with a flange 59 shaped to engage a shoulder 61 formed in the countersunk portion 62 of the opening 53 in the disc 51. The disc is mounted on the collar 58 and the collar is positioned at the lower end of the shaft 52. The extreme end of the shaft is of tubular construction and when the end 63 of the shaft is peened over against the collar 58 as shown, the disc and the respective bands are clamped between the shoulder 57 and the peened over end 63.

In Figs. 13–15 there is shown still another embodiment of the invention. Herein a disc 64 of a material similar to the disc 28 is secured to a beater 66 by a separate clamping means 67. The disc is formed with an annular shoulder 68 shaped to engage the mixing bowl 11. The clamping means comprises an annular member 69 having an annular flange 71 engageable with an annular shoulder 72 formed at the base of the disc 64. The clamping means is also provided with four bendable arms 73, 74, 76 and 77. The arms are disposed so that with the disc 64 in the position shown in Fig. 13 the respective arms are bent back on the side of the bands 78 and 79 away from the disc to positively secure the disc 64 to the beater 66. As shown, the extreme ends of the arms are curved as at 81, 82, 83 and 84 so as to fit snugly up against the beater shaft 86. Where desired, these arms may be welded to the shaft after the assembly of the disc on the beater.

While I have shown several embodiments of my invention it will be understood that I do not wish to be limited thereto since many modifications may be made and I therefore contemplate by the claims to cover such modifications as fall within the true spirit and scope of my invention.

I claim:

1. For use in a food mixer of the type comprising a rotatable mixing bowl and a rotatable power driven beater including a beater shaft adapted to be disposed in the mixing bowl, means for rotating said mixing bowl in response to rotation of said beater comprising a non-metallic friction driving disc and means for fastening said disc to said beater adjacent the end of said beater shaft with the axes of said disc and shaft coaxial, whereby said disc is in frictional driving engagement with the inside surface of the bottom of said bowl and generally immersed in the material mixed in said mixing bowl, the portion of said disc in frictional driving engagement with said bowl comprising a relatively narrow annular portion, successive parts of which drivingly engage with the inside surface of said bowl adjacent the junction of the bottom and side wall thereof, said disc having good resistance to wear under rubbing action with said bowl and having a relatively high coefficient of friction with said bowl, said disc being relatively chemically inert to substantially all materials mixed by said food mixer.

2. In a food mixer of the type in which a beater having radially disposed beater band members is utilized to rotate a mixing bowl, a disc forming a frictional driving connection between said beater and the bowl, said disc having an annular edge on one side thereof engageable with said bowl and having at least one transversely extending groove on its opposite side shaped to receive one of the band members of the beater, the side walls of said groove being undercut to form spaced portions overhanging the band therein for securing the disc to the beater, said overhanging portions being resilient to the extent to permit one of the band members to be received in the bottom of the groove.

3. In a food mixer of the type in which a mixing bowl is rotated by a beater formed by band members secured to a shaft, a disc shaped to be disposed between said beater and the bowl to form a frictional driving connection therebetween, said disc being formed from polyamide material and having one side formed with an annular edge engageable with the bowl and having its opposite side formed with grooves extending transversely across said disc and shaped to receive said band members, one of said grooves having spaced side walls overlying the bottom of the groove and shaped to overlie the band member therein to secure the disc to the beater.

4. The combination set forth in claim 1, in which the beater has radially disposed band members and the driving disc is provided with an annular shoulder in spaced relation to said annular portion, and an annular member having a flange engageable with said shoulder and having a plurality of bendable arms capable of being deformed about the band members of the beater to secure the disc to the beater.

5. The combination set forth in claim 1, in which the beater comprises one or more bands and the annular portion of said driving disc comprises an annular edge on one side engageable with said bowl and having an annular shoulder in spaced relation with said annular edge, and a ring member shaped to engage said shoulder and having spaced arms adapted to be bent over the bands forming the beater to secure the disc thereto.

6. The combination set forth in claim 1, in which the driving disc is formed from polyamide material molded on said beater.

7. A food mixer comprising a rotatable agitator having at least one beater shaft, radially disposed bands attached to the lower end of said shaft, a bowl freely revolubly mounted in juxtaposition to the agitator so as to receive the agitator therein for mixing material in said bowl, a frictional member of non-metallic material mounted on the lower end of said beater shaft and projecting below the end of said beater shaft, said frictional member engaging in a torque transmitting manner said radially disposed bands at a point beyond the circumference of said beater shaft and including means for rigidly interrelating said shaft, said member and said radially disposed bands, said member having an annular portion engageable with the inside surface of said bowl thereby automatically revolving the bowl when the agitator is operated.

8. The combination set forth in claim 1, in which said driving disc is a polyamide disc.

9. In a food mixer of the type in which a beater having radially disposed beater band members is utilized to rotate a mixing bowl, a disc adapted to be attached to said beater forming a frictional driving connection between said beater and said bowl, said disc having an annular surface portion engageable with the inside surface of said bowl for rotating said bowl in response to rotation of said beater, said disc having a second surface portion capable of being in intimate engagement with said band members whereby a torque for rotating said disc is transmitted thereto through said band members, and means for fastening said disc to said beater with said second surface portion in torque transmitting relationship with said band members.

IVAR JEPSON.

REFERENCES CITED

The following references are of record in the file of this patent:

UNITED STATES PATENTS

| Number | Name | Date |
| --- | --- | --- |
| 2,008,184 | Mross | July 16, 1935 |
| 2,270,164 | Du Rietz et al. | Jan. 13, 1942 |